(12) United States Patent
Bilan et al.

(10) Patent No.: US 9,836,262 B2
(45) Date of Patent: Dec. 5, 2017

(54) DOCUMENT AUDIT TRAIL FOR PRINT JOBS IN A WORKFLOW

(71) Applicants: Thomas Nathan Bilan, Longmont, CO (US); Linda Sue Liebelt, Boulder, CO (US); Michael Glen Lotz, Longmont, CO (US); Marquis G. Waller, Beverly, OH (US)

(72) Inventors: Thomas Nathan Bilan, Longmont, CO (US); Linda Sue Liebelt, Boulder, CO (US); Michael Glen Lotz, Longmont, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/060,046

(22) Filed: Mar. 3, 2016

(65) Prior Publication Data

US 2017/0090839 A1 Mar. 30, 2017

Related U.S. Application Data

(60) Provisional application No. 62/234,392, filed on Sep. 29, 2015.

(51) Int. Cl.
*G06F 3/12* (2006.01)
(52) U.S. Cl.
CPC .......... *G06F 3/1275* (2013.01); *G06F 3/127* (2013.01); *G06F 3/1207* (2013.01); *G06F 3/1208* (2013.01); *G06F 3/1256* (2013.01); *G06F 3/1273* (2013.01); *G06F 3/1274* (2013.01); *G06F 3/1288* (2013.01)

(58) Field of Classification Search
USPC ...................................................... 358/1.15
See application file for complete search history.

(56) References Cited

U.S. PATENT DOCUMENTS

| | | | |
|---|---|---|---|
| 5,371,838 A | 12/1994 | Fujii et al. | |
| 7,502,527 B2 | 3/2009 | Momose et al. | |
| 7,538,910 B2 | 5/2009 | Czudak et al. | |
| 8,032,464 B2 | 10/2011 | Miyata | |
| 8,102,551 B2 | 1/2012 | Shiohara et al. | |
| 8,144,360 B2 | 3/2012 | Buckley | |
| 8,233,180 B2 | 7/2012 | Shepherd et al. | |
| 8,269,837 B2 | 9/2012 | Shirakawa et al. | |
| 8,619,269 B2 | 12/2013 | Jahn et al. | |
| 8,699,076 B2 | 4/2014 | Tonouchi | |
| 2006/0197977 A1* | 9/2006 | Miyata | G06F 3/1204 358/1.15 |

(Continued)

FOREIGN PATENT DOCUMENTS

JP 2006072521 A 3/2006

*Primary Examiner* — Ngon Nguyen
(74) *Attorney, Agent, or Firm* — Duft Bornsen & Fettig LLP

(57) ABSTRACT

Systems and methods are provided for a document audit trail for print jobs in a workflow. One system includes a controller that directs a device of a print shop in accordance with a workflow. The controller detects a deletion event of a document of the print job while the document is in the workflow, advances the document to a store step defined in the workflow, identifies document properties to record for the document based on configurable parameters of the store step, and to record values of the document properties in a history file.

20 Claims, 6 Drawing Sheets

(56) References Cited

U.S. PATENT DOCUMENTS

| | | |
|---|---|---|
| 2009/0225365 A1 | 9/2009 | Hayakawa |
| 2009/0260017 A1* | 10/2009 | Yoshida ................ G06F 9/5038 718/105 |
| 2012/0147426 A1 | 6/2012 | Naka et al. |
| 2013/0208292 A1* | 8/2013 | Akari ..................... G06F 3/121 358/1.13 |
| 2013/0293911 A1 | 11/2013 | Watanabe et al. |
| 2016/0291909 A1* | 10/2016 | Liebelt .................. G06F 3/1263 |

* cited by examiner

| PROPERTY | STATUS/INFO | TIMESTAMP |
|---|---|---|
| TIME PRINTED | QUEUED (DID NOT PRINT) | N/A |
| VIEWED BY | USER XYZ | Jul. 12, 2015, 1:10:35 PM |
| WORKFLOW SELECTED | WORKFLOW ABC | N/A |
| USER AT DELETION | USER XYZ | N/A |
| TIME OF DELETION | N/A | Jul. 12, 2015, 1:15:04 PM |
| CURRENT STEP | ASSEMBLE | Jul. 12, 2015, 1:09:24 PM |
| | | |
| | | |
| | | |
| | | |
| | | |
| | | |
| | | |

"DOCUMENT AUDIT TRAIL FOR PRINT JOBS IN A WORKFLOW

RELATED APPLICATIONS

This document claims priority to provisional U.S. Patent Application 62/234,392 (filed on Sep. 29, 2015) titled "DOCUMENT AUDIT TRAIL FOR PRINT JOBS IN A WORKFLOW," which is hereby incorporated by reference.

FIELD OF THE INVENTION

The invention relates to the field of print job management, and in particular, to workflow systems for a print shop.

BACKGROUND

Print shops handle sophisticated and/or large volume print jobs for customers. A print shop typically includes a number of high-end printers (e.g., multifunction printers, continuous-forms production printers, etc.) that are capable of providing more functionality and/or print volume than a simple office printer. For example, a print shop may be used to print massive print jobs (e.g., having hundreds of thousands of pages) on a monthly basis in order to provide documents such as billing statements to large volumes of people.

For large jobs that include many individual documents, it may be beneficial to record the properties of completed documents. That is, as each document successfully completes through a workflow, certain document properties such as when it was printed, who it was directed to, or the address to which it was mailed may be stored in an archive. Such archived information may prove useful if a need arises at a future time to prove how a document or its data has been handled.

SUMMARY

Embodiments described herein store the properties of a document that is being deleted from a workflow. This enables the generation of an archive/history showing pertinent information of how the document was processed despite its incompletion through the workflow. This information in turn allows an audit trail of the document to be produced despite the document having never completed its workflow.

One system includes a controller that directs a device of a print shop in accordance with a workflow that comprises a predetermined set of activities to perform upon documents of a print job. The controller detects a deletion event of a document of the print job while the document is in the workflow, advances the document to a store step defined in the workflow, identifies document properties to record for the document based on configurable parameters of the store step, and records values of the document properties in a history file.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 5 is a block diagram illustrating a history file in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
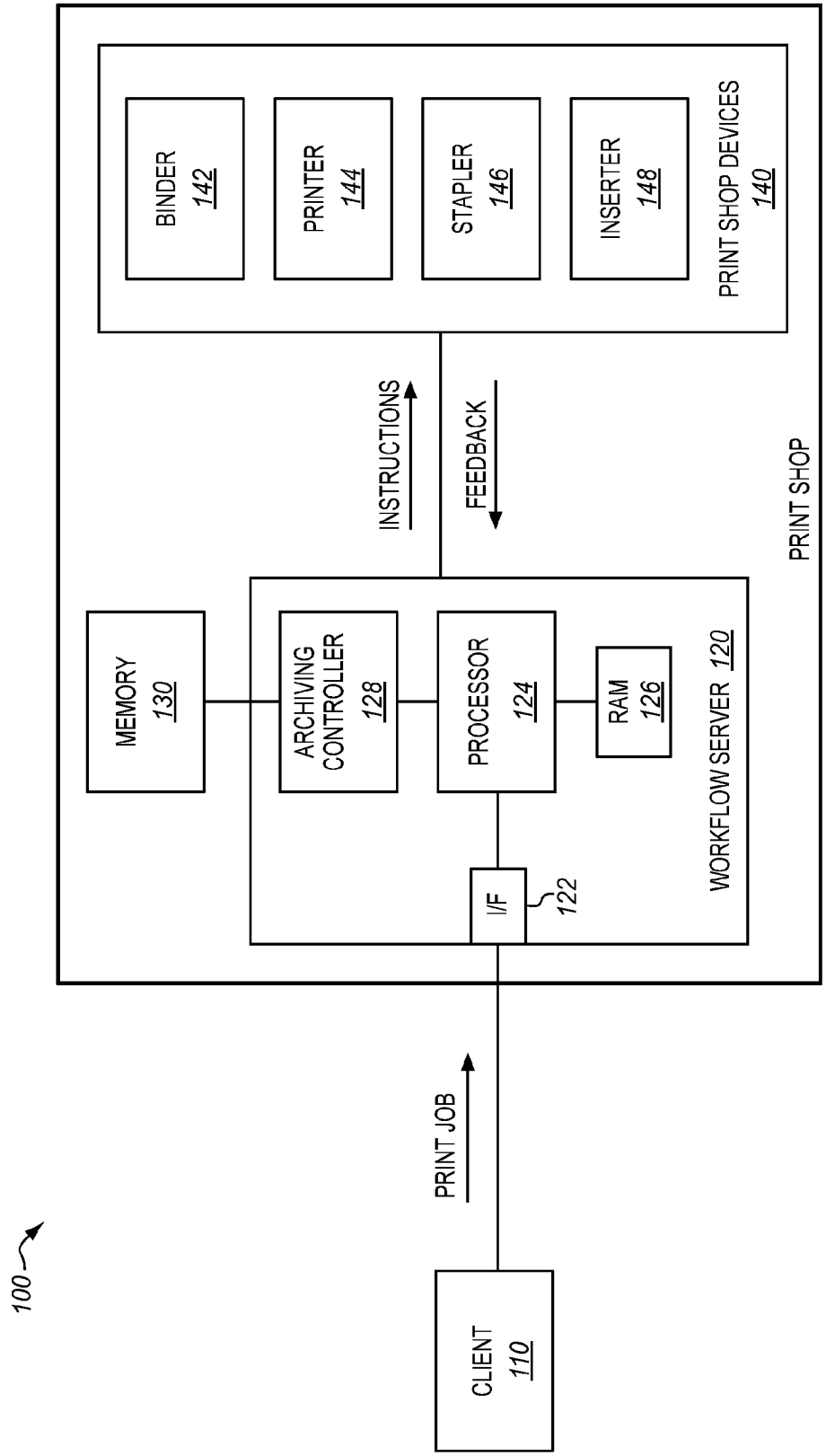
FIG. 1 is a block diagram of a workflow system in an exemplary embodiment.

FIG. 1 is a block diagram of a workflow system 100 in an exemplary embodiment. In workflow system 100, an incoming job (e.g., a print file and accompanying job ticket) is received from client 110 at workflow server 120. Workflow server 120 reviews the incoming print job, and identifies a workflow for the print job. A workflow may be an organized set of print shop activities to perform for the print job, and the workflow may be stored as data on workflow server 120 that defines each activity as well as an overall order in which to perform the activities. A workflow may be selected from pre-defined templates as desired, manually entered, or loaded from an external source. After a workflow has been chosen, workflow server 120 may direct the devices of the print shop in accordance with the workflow to ensure that the print job is properly handled at the print shop. Workflow server 120 may store an archive of data describing print jobs that have already been completed at the print shop.

Print shop devices 140 may include the devices and components of the print shop that perform the various activities described herein. For example, print shop devices 140 may include printers, post-printing machinery, e-mail or web publishing servers, etc. The print shop devices illustrated in FIG. 1 provide an example of the variety of print shop devices that may be utilized by a print shop. In this embodiment, binder 142 operates to bind printed pages into magazines or books, printer 144 operates to rasterize and print incoming print data onto physical pages, stapler 146 staples groups of pages together, and inserter 148 inserts physical pages into envelopes for mailing/delivery to recipients.

Workflow system 100 has been enhanced to detect a deletion event of one or more documents in a print job that are being actively processed in the workflow and to record a customizable set of values for the document being deleted into an archive. Previous systems are capable of storing data which describes print jobs that have already been completed at the print shop but are unable to retrieve data pertaining to a document or print job which did not complete through the workflow (e.g., an asynchronous operation action to delete was performed).

In this embodiment, workflow server 120 includes an interface (I/F) 122 (e.g., an Ethernet interface, wireless interface, etc.) for receiving print data for print jobs from client 110. Workflow server 120 further includes a processor 124 for managing print jobs received at workflow server 120, and a Random Access Memory (RAM) 126 (e.g., a hard disk, etc.) for storing print jobs from client 110. Workflow server 120 also includes archiving controller 128 operable to create and manage archives in memory 130 which stores data pertaining to print jobs and/or documents processed through a workflow in workflow server 120. Archiving controller 128 and/or memory 130 may be implemented on different hardware than workflow server 120, but need not be. For example, memory 130 may comprise a remotely accessible storage system, or may comprise a component of workflow server 120. In any case, workflow server 120 may be capable of accessing and searching the archive in memory 130 to identify print jobs (and/or documents thereof) that have been completed. For example, server 110 may search the archive (e.g., via operator input at a graphical user interface (GUI) of workflow server 120) to find individual documents based on a customer name, an address, a ZIP code, etc.

Illustrative details of the operation of workflow system 100 will be discussed with regard to FIG. 2. Assume, for this embodiment, that client 110 has generated a print job for processing by the print shop, and has transmitted print data and a job ticket for the print job to workflow server 120.

Figure 2:
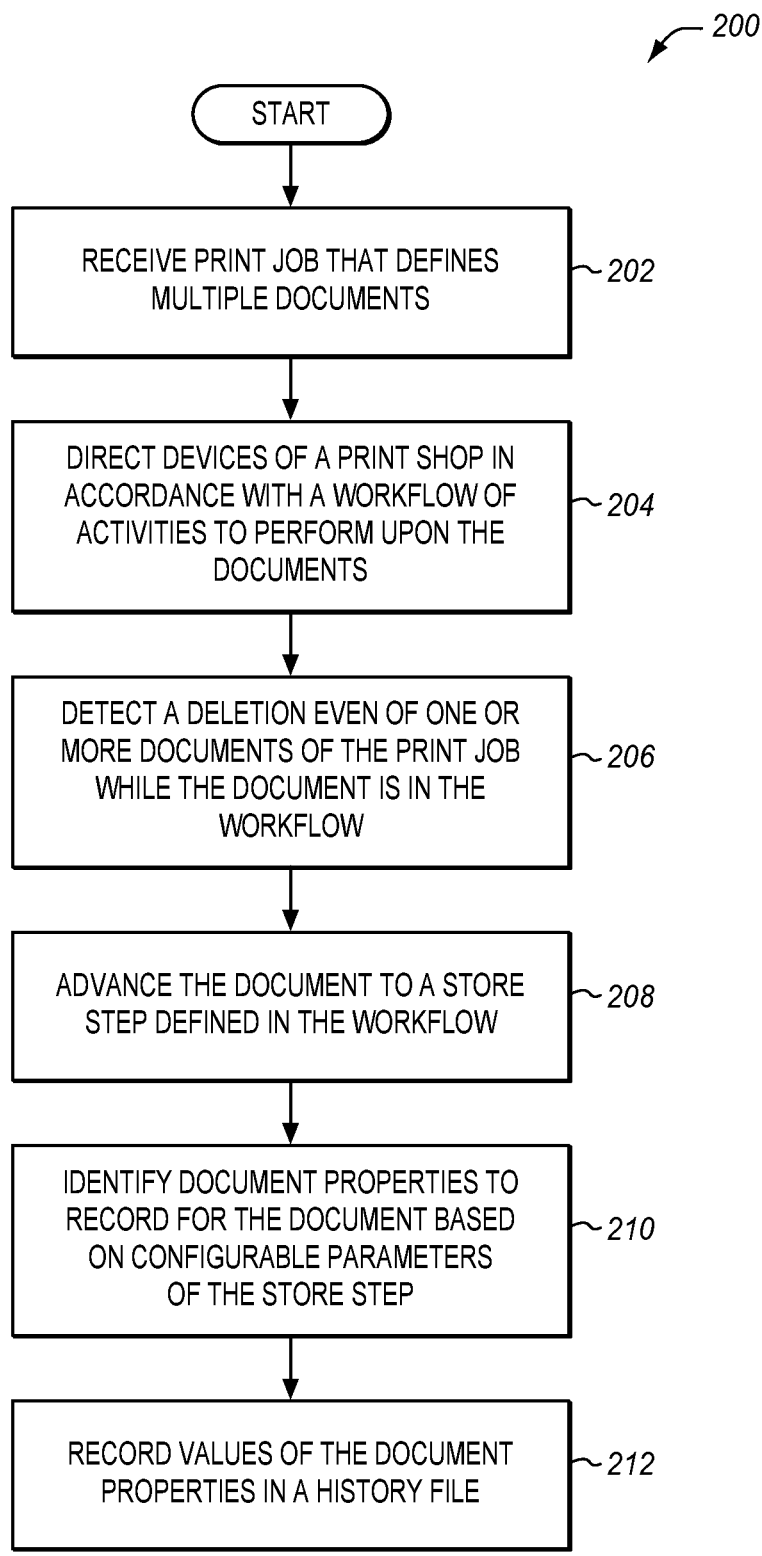
FIG. 2 is a flowchart illustrating a method for operating a workflow system in an exemplary embodiment.

FIG. 2 is a flowchart illustrating a method 200 for operating a workflow system in an exemplary embodiment. The steps of method 200 are described with reference to workflow system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, I/F 122 receives a print job that includes multiple documents from client 110. Each of the documents may indicate an intended recipient for delivery. That is, a job ticket for the print job may identify a recipient for each document, or each document may include print data that identifies a recipient. As used herein, a "document" may be an independent portion of a print job that is directed to a specific recipient for delivery (e.g., a single piece of mail). Thus, multiple documents may be defined in a single file of print data for a print job.

Alternatively, a document may be considered an independent portion of a print job that does not require other portions of the print job in order to maintain its whole context or meaning. For example, an individual chapter of a book is not a document, because the chapter needs to be read along with the other chapters of the book in order to be fully understood. In contrast, in a print job with thousands of bank statements where each bank statement is intended for delivery to a different account holder, each bank statement is a complete document in and of itself. The print data for the received print job may be formatted in a single file according to a Page Description Language (PDL), for example as an Advanced Function Presentation (AFP) datastream, as Portable Document Format (PDF) print data accompanied by Job Definition Format (JDF) job ticket instructions, or any other appropriate formatting known to those skilled in the art. Processor 124 may further analyze the print job to identify each document, as well as to determine information indicating the recipient of each document (e.g., account number, recipient name, address, etc.).

After the print job has been received, processor 124 may select a workflow for the print job. In one embodiment, workflow system 100 implements multiple "hot folders" or interfaces that are each associated with a different workflow, and client 110 submits a print job to one of the hot folders at workflow server 120 in order to indicate a desired workflow. In a further embodiment, a combination of print job name and hot folder may be used to identify a workflow for the print job.

The workflow may define an ordered set of print shop activities that are stored in memory (e.g., in RAM 126). The workflow may be unique for each print job, or it may be used on multiple print jobs. Processor 124 may contain a default workflow programmed into it, or it may be manually entered or otherwise loaded into it by a user. For example, the workflow may include configurable activities for directing a printer to print, or directing an inserter to insert documents into an envelope. When properly assembled and configured, the workflow may comprise the digitally-defined order of operations to perform at the print shop in order to handle the print job properly. That is, the activities defined in the workflow, when performed in order, enable workflow server 120 to communicate with/manage the print shop devices and process the print job as desired. Each activity in a workflow may be associated with a category or type of print shop device (e.g., post-processing devices, printers, inserters) and may also be associated with specific named print shop devices. These activities may include printing or non-printing activities (e.g., billing, shipping, document review, multimedia/digital/internet activities, credit checks, etc.) as desired. Furthermore, each activity may be associated with different states that a print job (or document thereof) occupies. A queued state indicates that a document (or job) may be presently ready for processing by the activity, a processing state indicates that a document (or job) may be actively being processed in an activity (e.g., is actively being printed/stapled by a corresponding device), and a complete state indicates that a document (or job) may be ready to transition to the next activity in the workflow.

In step 204, processor 124 directs print shop devices 140 to process the print job in accordance with the workflow. Directing the individual print shop devices 140 may comprise identifying the current activity that has been reached in the workflow, sending instructions to the appropriate print shop device based on the current activity, awaiting feedback from the device indicating that processing has successfully completed for the workflow activity, and advancing the print job to the next workflow activity (as internally tracked by processor 124). Advancing the print job may comprise transmitting new instructions to the next print shop device that will be handling the print job. Processor 124 may track the current activity on a document-by-document basis or may track the current activity for the entire print job as a whole.

Processor 124 may track properties for each of the documents of the print job while the print job is being processed in the workflow. As used herein, a property of a document may be a piece of information describing the document itself, and/or how the document is being processed as it moves through a workflow. For example, a property may indicate the number of pages in the document, a time that a workflow activity was performed for the document, a status of the document as the document is being processed, a format of print data for the document, etc. Processor 124 may identify the properties to track by using an algorithm to determine which properties to store (e.g., the largest field, the first five fields, etc.), or by accessing parameters stored in internal memory to determine which document properties to track. For instance, rules of which types of properties to track may be defined by the workflow processing the print job. Processor 124 may monitor the identified properties continuously, periodically, or in response to triggering events as desired.

In step 206, archiving controller 128 detects a deletion event of one or more documents of the print job while the document is in the workflow. Archiving controller 128 may detect user input requesting that document(s) or a print job be removed from the workflow. Thus, the deletion event may occur at the print shop (e.g., as a result of operator input at a GUI at workflow server 100), and may be directly related to the processing or removal from processing of the document in the workflow. Alternatively or additionally, archiving controller 128 may detect a deletion or request for deletion of document(s) from the print job. In one embodiment, processor 124 detects a deletion instruction/request and reports information of the deletion event, document and/or print job to the archiving controller 128.

Processor 124 may identify print shop devices that are currently processing the document, and transmit queries to those print shop devices in order to determine the current tracked properties of the document when the deletion event occurred. Processor 124 may correlate a page in connection with the deletion with an individual document being actively processed in the workflow. That is, in response to the deletion event, processor 124 executes steps in the workflow that are configured to execute in the event of a deletion. An example of such a step is a store step that records the fact that the document was deleted.

In step 208, archiving controller 128 advances the document to a store step defined in the workflow. Archiving controller 128 may automatically move document(s) associated with the deletion event to a step designated for deletion events or types of deletion events. Alternatively or additionally, archiving controller 128 may automatically select and initiate processing of document(s) in connection with the delete event to a different workflow (or a different series of steps or branch defined in the same workflow) either designated in memory or identified by the rules/parameters of the store step. The different workflow may ensure that the document does not leave the system without collecting all of the proper information which may be needed for business audit collecting. Alternatively or additionally, archiving controller 128 may automatically select and initiate processing of document(s) in connection with the delete event to a restart point or step in the workflow either designated for a deletion event or defined by the rules/parameters of the store step.

In step 210, archiving controller 128 identifies document properties to record for the document based on configurable parameters of the store step. Archiving controller 128 may further process the store step or series of store steps for additional actions to perform according to user configurable parameters or rules defined therein. For example, archiving controller 128 may identify contact information in the configurable parameters of the store step, and notify a user (e.g., via email) of the deletion event based on the contact information. The notification may include information of the delete event itself and/or values of document properties associated with documents in connection with the deletion event.

In step 212, archiving controller 128 records values of the document in a history file. Archiving controller 128 may record an entry for each of the one or more documents associated with the deletion event in the history file. Each entry in the history files indicates values of properties for the documents. Thus, after a deletion event of a document or print job has been detected, information describing that document or print job is stored in one or more history files in memory 130 by archiving controller 128.

As used herein, an entry may be a textual or numeric field that describes a different aspect of the document. An entry may describe any suitable properties of a document (and accompanying contextual information) that may be determined while the document is within the workflow, or concurrently with the deletion event, and/or prior to the actual removal of the document from the workflow as a result of the deletion event. Examples of an entry in the history file may include, but is not limited to, a time the deletion event occurred, a current activity in the workflow at the time of the deletion event, a status of the document/activity at the time of the deletion event, whether the document printed, a location or printer identification of where the document printed, a time the document printed, who viewed the document, whether the document was mailed, information describing the deletion event, the name of the customer to which a document was directed, an address of the customer, a ZIP code of the customer, a balance for a credit card or bank account of the customer, etc.

A history file may include a series of entries for an individual document or multiple documents. Archiving controller 128 may generate new history files or identify existing files to add new entries in a manner customizable by user input or according to the conditions for recording deleted documents as defined in workflow server 120 and/or the workflow. For instance, history files may be dedicated to a specified type of document, a date or range of dates in which the deletion event occurred, properties of the print job or workflow, etc. A user may generate a search request (e.g., via a remote client or directly via a user interface at server 110) and provide it to archiving controller 128 for retrieval of information of the deletion event at a later time. A search request may list one or more properties to be searched (e.g., customer name, address, etc.), and may include partial or complete values for those properties (e.g., John *, "no more than 50 pages in size," "printed before Jan. 15, 2015," part of print job X, etc.). Archiving controller 128 may also add a pointer within each newly generated record to point to the job file and/or record that it refers to for convenient retrieval of records.

In one embodiment, detection of the delete does not require the history file to be stored but allows the document to be ran through one or a series of steps of the workflow that allow all data to be captured before it is removed, thereby completing the full audit (e.g., no way for the document to leave the system without the audit trail being recorded).

EXAMPLES

In the following examples, additional processes, systems, and methods are described in the context of a workflow system that prints and sorts account statements for mass-mailing to customers.

In this example, a workflow server operates on a computer of the print shop that may be accessible via the Internet. The workflow server accesses print shop devices via an internal print shop intranet, to which a printer, e-mail server, and inserter of the print shop are connected. An incoming print job may be received at the workflow server via the Internet as a PDF print job that includes seven hundred thousand documents. Each of the documents corresponds with a credit card statement for a different account holder, and may be a mail piece intended for delivery to a different recipient. A controller at the workflow server loads the print job into memory, and determines that the print job is a "statements" type of print job based on the name of the print job and a file folder of the workflow server where the print job was received. The controller then assigns a workflow to the print job based on the type of job.

A print server at a print shop manages the operations of ten printers, and also includes an archiving controller that sets up, maintains, and stores an archive on a hard disk describing the documents deleted from the workflow. Thus, as documents are deleted, the print server creates new history files and/or places them in the appropriate directory of the archive.

Figure 3:
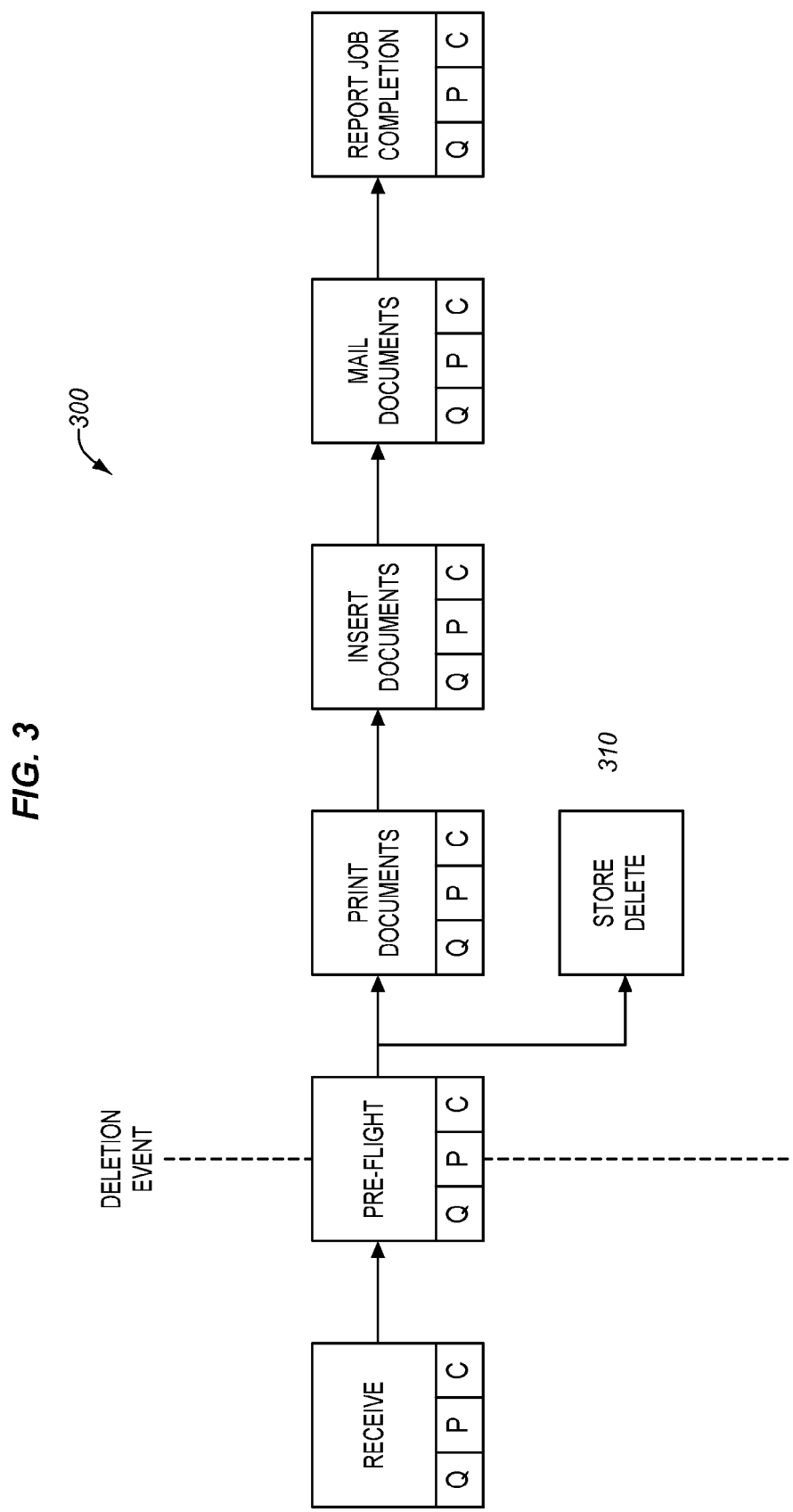
FIG. 3 is a block diagram illustrating a workflow and a deletion event in an exemplary embodiment.

FIG. 3 is a block diagram illustrating a workflow 300 and a deletion event in an exemplary embodiment. The processor or archiving controller may be able to track a document that has been deleted from the system at any point of processing and to record the same values (or a customizable set of values) defined by tracking information for the print job. The archiving controller may transition document(s) associated with the deletion event to a customizable store step 310 in the workflow. The store step may be configured by a user in advance to identify properties and/or conditions for recording properties of document(s) which are identified as being removed from a particular step within the workflow 300.

The workflow includes multiple configurable activities, and documents traveling through the workflow proceed through states for being queued (Q), actively processing (P), and complete (C). A controller of the workflow server may track information based on input by the print shop devices performing each of the activities. In this example, the workflow server itself performs the receive and pre-flight tasks, a printer manages the print documents activity, an inserter performs the insert documents activity, and the mail documents activity may be performed via a print shop operator, who utilizes a graphical user interface in order to report completion of various mailings to the workflow server. The controller may receive periodic input from the devices indicating a range of pages from the print job that have completed the step. The controller may correlate the range of pages with a set of documents defined in the print job, in order to determine which documents are queued, which document is processing for the activity, and which documents are completed with respect to an individual. In this example, the print job includes multiple documents that can each be handled in a different workflow activity as the print job itself is progressing through the workflow.

Deletion events may be detected at various times while a document is moving through the workflow. According to FIG. 3, a document may be in the processing state for the pre-flight activity when the deletion event is detected. When the deletion event is detected, the controller may process the deleted document through a step in the workflow that has been designated as the restart point when a deletion event occurs. That is, the location or point of processing of the deleted documents may be altered or backed up within the workflow in response to the deletion event such that a different step or series of steps are to be completed before the documents are allowed to complete and exit the workflow. In this case, that step may be a store step that determines what information to archive about the deleted document.

Figure 4:
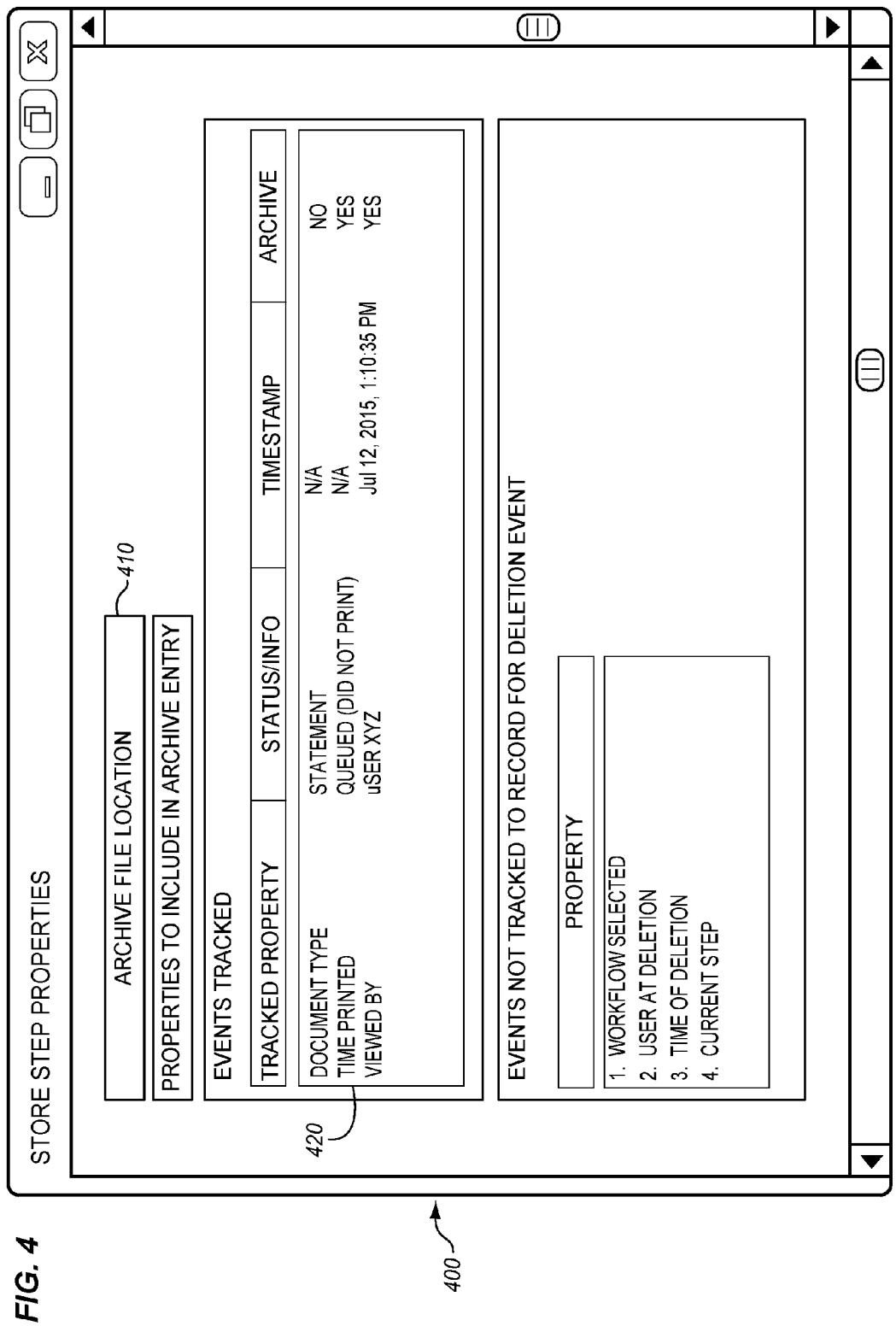
FIG. 4 is a block diagram illustrating a user configurable store step in an exemplary embodiment.

FIG. 4 is a block diagram illustrating a user configurable store step 400 in an exemplary embodiment. The store step 400 may be designated as the step to go to when a user deletes a job or document. Properties of the store step 400 are shown as displayed to a user at a software window in FIG. 4. According to FIG. 4, the stores step includes user-configurable properties, including a pointer 410 to a file location for an archive/history file for a document, and a list of properties 420 to add to each new entry in the archive/history file.

Listeners configured to detect and track events for a print job in a print workflow may watch for jobs to complete each step that is to be tracked and record a timestamp of the event. The controller may thus determine that a document has just entered or left the processing state of a given activity for identification of the appropriate store step to transition to and/or document properties to record. In this example, the job or document is deleted during processing at the pre-flight stage and the document(s) associated with the deletion event are automatically moved to store step 400 in the workflow. The store step 400 enables the same (or more) tracking information, including timestamps, to be stored when a job or document is deleted as is stored when successful processing steps occur. Tracking data may consist of properties of the job or document at the time the step runs. The store step may be configured to write those timestamps and the properties of documents associated with the deletion event in the archive. Thus, archiving controller may store a processing history which indicates status changes for the document during its travel between workflow activities up to the deletion event. For example, individual pieces of information being tracked in workflow (e.g., Events Tracked) may be included or excluded from the archive of a deletion event as desired. Alternatively or additionally, individual pieces of information related to properties not being tracked in the workflow may also be added to the archive upon a deletion event.

FIG. 5 is a block diagram illustrating a history file 500 in an exemplary embodiment. Based on the analysis of conditions of store step 400, the archiving controller updates/appends the identified history by adding an entry describing the values of the properties of the document to record in accordance with the customized store step 400. Each record written by the store step 400 may include an entry type that can be used to retrieve the records from the repository so a user can find the documents or jobs that were deleted in a certain time period or for a certain application type.

Each entry may include a field and/or a timestamp indicating when the triggering event was detected, a state indicating a state of the document with respect to the event, a field for activity indicating the workflow activity that was being performed for the document when the triggering event was detected, a field for workflow indicating what workflow was being processed at the time, etc. For example, an entry may indicate whether the document is currently in the printing activity, the pre-flight activity, the receive activity, etc. or the name of the workflow. Tracking the type of workflow may be beneficial in embodiments where the history file tracks properties for documents across multiple print jobs, which each may be associated with a different workflow. Other examples of entries, include but are not limited to, a timestamp indicating when the deletion event occurred, information describing the deletion event, the customer that sourced the document, a first page of the document in a print file for the entire print job, a last page of the document in the print file, a type of form for the document (in this case, an account statement, instead of for example a copy of a book or report), a data type for the document indicating the PDL used to describe the document, a location of the history file on a shared file server. Further document properties may be placed into the history file by the controller as desired based on the user-configurable settings of the store step object described in FIG. 4. The ability to record the fact that a deletion occurred as the job or document leaves the system is an improvement over previous tracking solutions because it closes a loophole where tracking data was not recorded when the asynchronous operator action to delete was performed.

Figure 6:
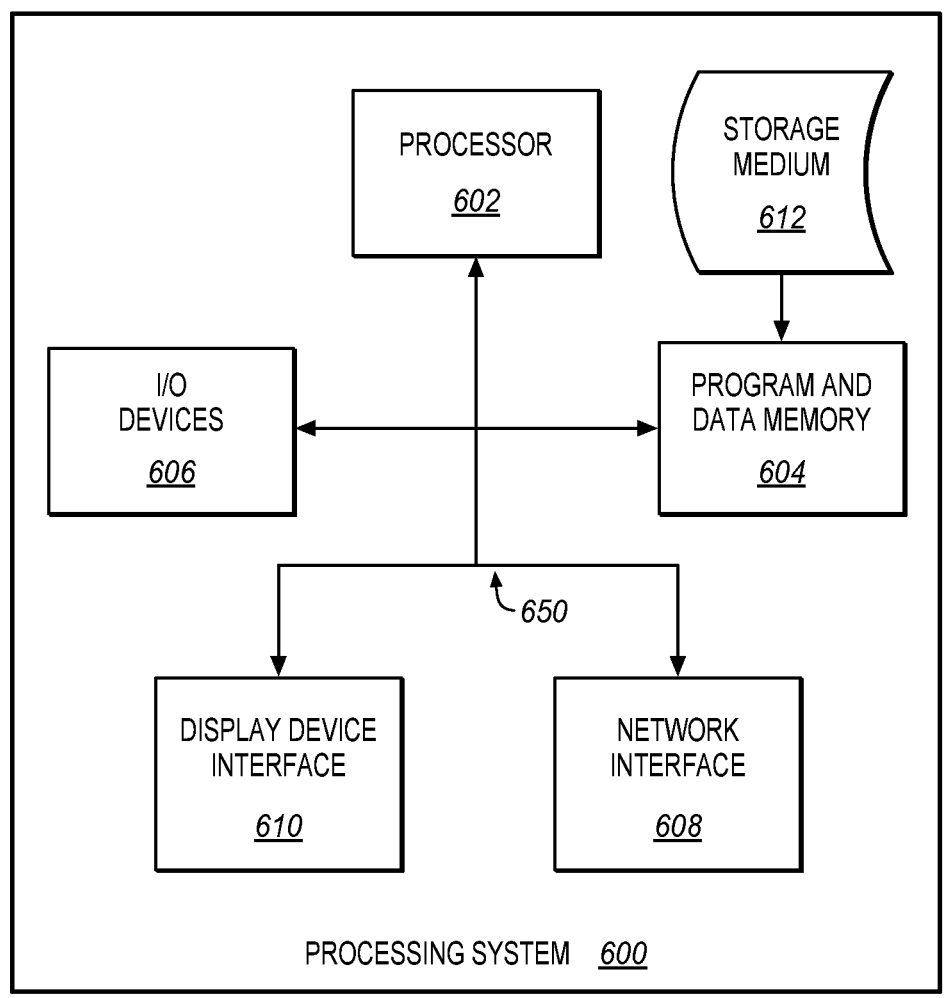
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of workflow server 120 to perform the various operations disclosed herein. FIG. 6 illustrates a processing system 600 operable to execute a computer readable medium embodying programmed instructions to perform desired functions in an exemplary embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 600, being suitable for storing and/or executing the program code, may include at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments were described herein, the scope of the invention is not limited to those specific embodiments. The scope of the invention is defined by the following claims and any equivalents thereof.

We claim:

1. An apparatus comprising:
an interface configured to receive a print job that defines multiple documents; and
a controller, implemented by a processor and memory, configured to direct devices of a print shop in accordance with a workflow that comprises a series of configurable steps that define a set of activities to perform upon the documents of the print job;
wherein the controller is configured to detect a deletion event of a document of the print job while the document is in the workflow, to advance the document to a store step defined in the workflow, to identify document properties to record for the document based on configurable parameters of the store step, to record values of the document properties in a history file, to remove the document from the workflow, and to advance other documents of the print job to other steps of the workflow for completion through the workflow.

2. The apparatus of claim 1 wherein:
the controller is configured to identify a separate workflow from the configurable parameters of the store step, and to process the document in the separate workflow in response to the deletion event.

3. The apparatus of claim 1 wherein:
the controller is configured to identify a restart point in the workflow from the configurable parameters of the store step, and to initiate processing of the document in the workflow according to the restart point.

4. The apparatus of claim 1 wherein:
the controller is configured to prevent removal of the document from the workflow until the document is successfully processed through the store step.

5. The apparatus of claim 1 wherein:
the controller is configured to identify contact information in the configurable parameters of the store step, and to notify a user of the deletion event based on the contact information.

6. The apparatus of claim 1 wherein:
the controller configured to automatically move the document to the store step in response to the deletion event.

7. The apparatus of claim 1 wherein:
the document properties to record for the document in response to the deletion event comprise one of a time the deletion event occurred, a current activity in the workflow at the time of the deletion event, and a user that last viewed the document prior to the deletion event.

8. A method comprising:
receiving a print job that defines multiple documents;
directing devices of a print shop in accordance with a workflow that comprises a series of configurable steps that define a set of activities to perform upon the documents of the print job;
detecting a deletion event of a document of the print job while the document is in the workflow;
advancing the document to a store step defined in the workflow;
identifying document properties to record for the document based on configurable parameters of the store step;
recording values of the document properties in a history file;
removing the document from the workflow; and advancing other documents of the print job to other steps of the workflow for completion through the workflow.

9. The method of claim 8 further comprising:
identifying a restart point in the workflow from the configurable parameters of the store step; and
initiating processing of the document in the workflow according to the restart point.

10. The method of claim 8 further comprising:
preventing removal of the document from the workflow until the document is successfully processed through the store step.

11. The method of claim 8 further comprising:
identifying contact information in the configurable parameters of the store step; and
notifying a user of the deletion event based on the contact information.

12. The method of claim 8 further comprising:
automatically moving the document to the store step in response to the deletion event.

13. The method of claim 8 wherein:
the document properties to record for the document in response to the deletion event comprise one of a time the deletion event occurred, a current activity in the workflow at the time of the deletion event, and a user that last viewed the document prior to the deletion event.

14. The method of claim 8 further comprising:
identifying a separate workflow from the configurable parameters of the store step; and
processing the document in the separate workflow in response to the deletion event.

15. A non-transitory computer readable medium embodying programmed instructions which, when executed by a processor, are operable for performing a method comprising:
receiving a print job that defines multiple documents;
directing devices of a print shop in accordance with a workflow that comprises a series of configurable steps that define a set of activities to perform upon the documents of the print job;
detecting a deletion event of a document of the print job while the document is in the workflow;
advancing the document to a store step defined in the workflow;
identifying document properties to record for the document based on configurable parameters of the store step;
recording values of the document properties in a history file;
removing the document from the workflow; and
advancing other documents of the print job to other steps of the workflow for completion through the workflow.

16. The medium of claim 15 wherein the method further comprises:
identifying a separate workflow from the configurable parameters of the store step; and
processing the document in the separate workflow in response to the deletion event.

17. The medium of claim 15 wherein the method further comprises:
identifying a restart point in the workflow from the configurable parameters of the store step; and
initiating processing of the document in the workflow according to the restart point.

18. The medium of claim 15 wherein the method further comprises:
preventing removal of the document from the workflow until the document is successfully processed through the store step.

19. The medium of claim 15 wherein the method further comprises:
identifying contact information in the configurable parameters of the store step; and
notifying a user of the deletion event based on the contact information.

20. The medium of claim 15 wherein the method further comprises:
automatically moving the document to the store step in response to the deletion event.

* * * * *